Jan. 21, 1964  E. W. SPRINGER  3,119,090
SEA DEPTH DETERMINATION AIR SURVEY MEANS
Filed July 3, 1952  3 Sheets-Sheet 1

INVENTOR:
EARL W. SPRINGER
BY
K. W. Wonnell
ATT'YS

Jan. 21, 1964     E. W. SPRINGER     3,119,090
SEA DEPTH DETERMINATION AIR SURVEY MEANS
Filed July 3, 1952     3 Sheets-Sheet 2
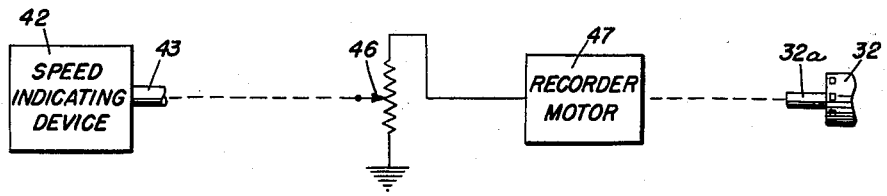
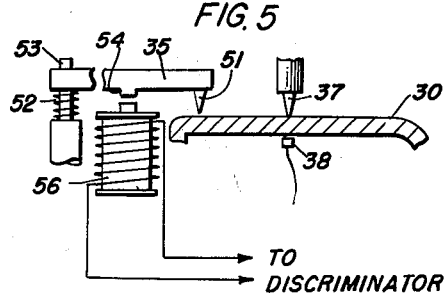
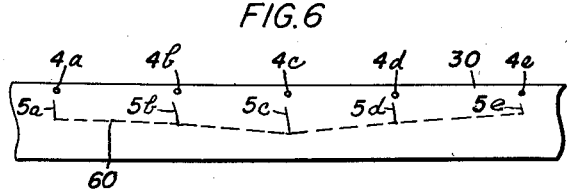
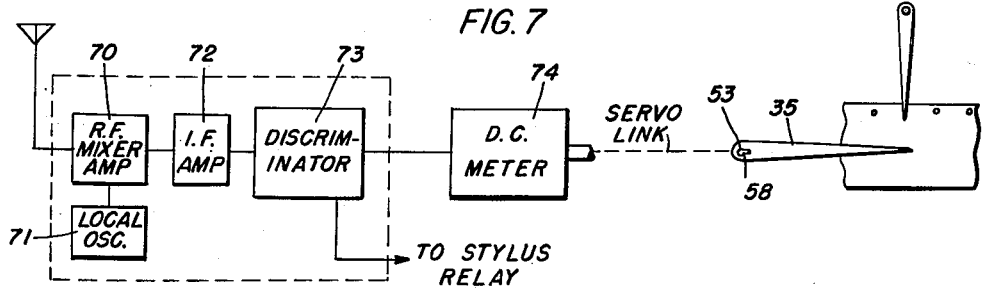
INVENTOR:
EARL W. SPRINGER
BY
*K. W. Worrell*
ATT'YS Jan. 21, 1964 E. W. SPRINGER 3,119,090
SEA DEPTH DETERMINATION AIR SURVEY MEANS
Filed July 3, 1952 3 Sheets-Sheet 3
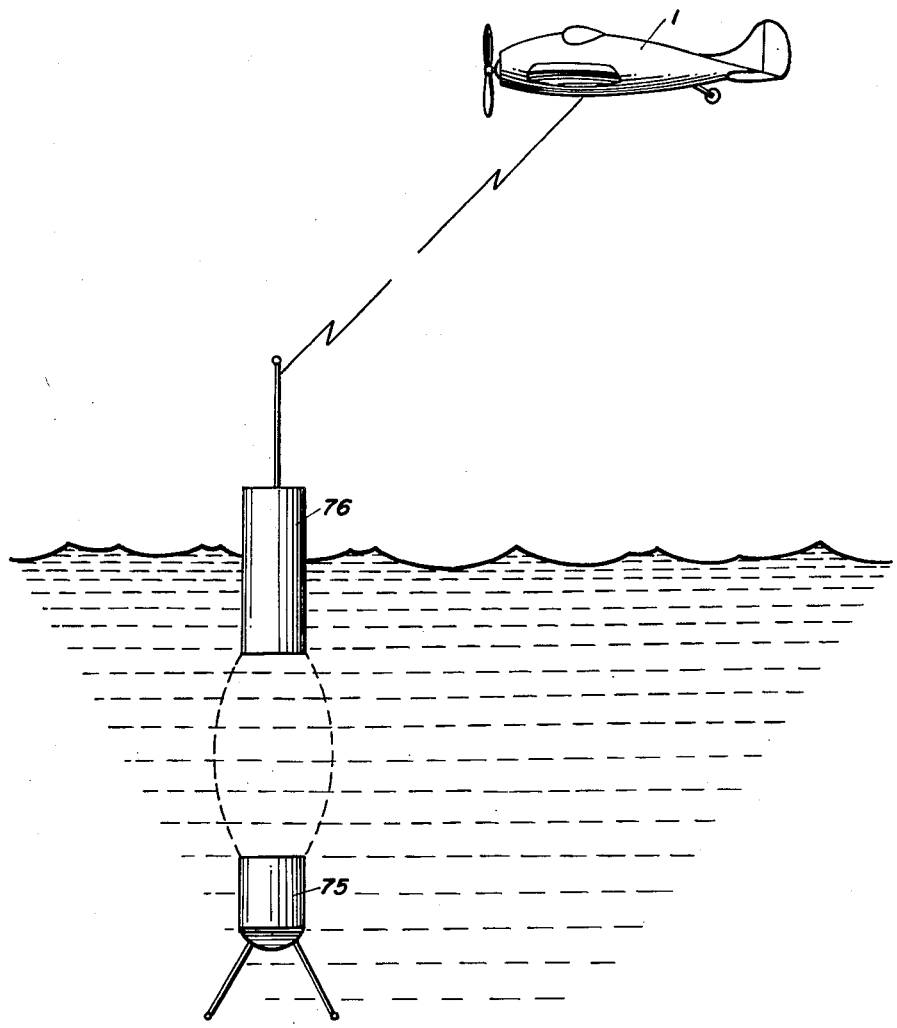
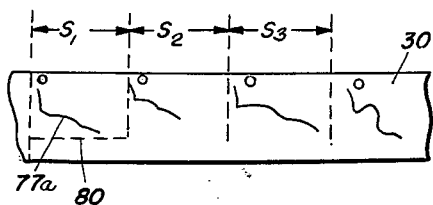
INVENTOR:
EARL W. SPRINGER
BY
AT T'YS

3,119,090
SEA DEPTH DETERMINATION AIR SURVEY MEANS

Earl W. Springer, Indianapolis, Ind., assignor, by mesne assignments, to the United States of America as represented by the Secretary of the Navy
Filed July 3, 1952, Ser. No. 297,033
12 Claims. (Cl. 340—2)

This invention relates to a method and apparatus for indicating oceanographic conditions.

It often has been found essential to make rapid determinations of the depth, temperature, velocity, and other oceanographic conditions of a body of water in certain designated areas such as along a shore preceding amphibious operations and the like. To make such a survey, if the area to be surveyed is at all extensive, it would ordinarily require a considerable amount of time and equipment.

One object of the invention is, therefore, to provide a novel method and apparatus by which the oceanographic conditions of a relatively large body of water may be quickly surveyed.

Another object of the invention is to provide a novel method and apparatus including an airborne vehicle for providing a quick survey of the oceanographic conditions of a large body of water.

Still another object of the invention is to provide an apparatus by which an air survey of the depth variation of a body of water may be simply and quickly measured and recorded.

One feature of the invention comprises the method of obtaining a survey of the oceanographic conditions of a given body of water by dropping a series of floatable radio buoys at known points in said body of water, each buoy having suitable equipment therein for determining the depth or other oceanographic characteristics of the water beneath the same and telemetering this information to a remote point, where a plot is made of the location of each buoy and the condition measured thereby, so that the information is presented in usable graphic form.

Another feature of the invention resides in utilizing an airplane or other vehicle to drop the radio buoys along a predetermined path, which airplane carries a strip recording apparatus for automatically indicating the points along said path where the various radio buoys were dropped.

A more specific feature of the invention resides in providing means for moving the recording strip of the recorder apparatus at a speed dependent upon the speed of the buoy-dropping vehicle, so that an accurate plot of buoy positions may be quickly obtained.

A further feature of the invention comprises incorporating in said recorder apparatus a means for recording the oceanographic information related to the respective radio buoys on the strip opposite the points indicating the positions of the buoys transmitting such information to thereby provide an effective and useful record of the oceanographic information of the part of the body of water surveyed.

Other objects and features of the invention as well as a more detailed explanation and disclosure thereof may be obtained by referring to the specification to follow and the drawings, wherein:

FIG. 4 is a block diagram of an apparatus for controlling the speed of the recording strip;

FIG. 5 is a plan view in partial cross section of the recording apparatus;

FIG. 6 is an elevational view of the recording strip after the recording apparatus has recorded the information received from the buoys;

FIG. 7 is a block diagram of the receiving apparatus which controls the position of the condition-indicating stylus, shown at the left in FIG. 3;

FIG 8 is an elevational view showing a radio buoy which differs from that shown in FIG. 2 by including apparatus for measuring water conditions which vary with the distance below the buoy; and FIG. 9 shows the recording strip bearing indications obtained from the buoy apparatus of FIG. 8, the marginal perforations used for translation of the strip being omitted.

Reference should now be made to the drawings wherein similar reference characters indicate like elements throughout.

Figure 1:
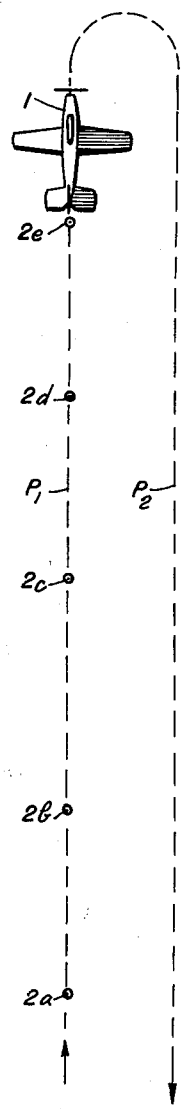
FIG. 1 is a plan view representing a series of buoys which have been dropped along a path of light by an airplane.
Figure 2:
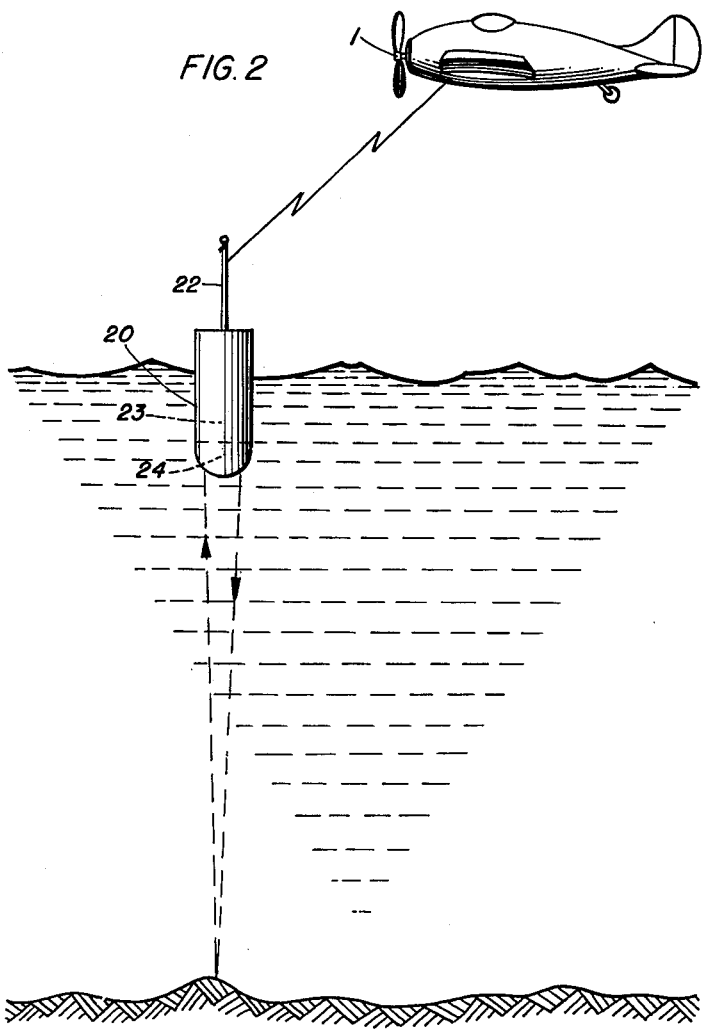
FIG. 2 is an elevational view of one of the buoys in electronic relation to an airplane.

As previously stated, it is often necessary that a quick and accurate survey of the characteristics of a given body of water be made. To this end, this invention utilizes a vehicle such as an airplane 1 which drops a plurality of buoys 2a, 2b, 2c, etc. along a predetermined path $P_1$—$P_2$ (FIG. 1). Each buoy (FIG. 2) may comprise a floatable chamber 20, a radio antenna 22 projecting from the top portion thereof, a radio transmitter 23, and a device 24 for measuring the depth or other specific characteristic, quality or condition of water in the vicinity of the buoy, the transmitter and measuring device being carried in the chamber.

The condition measuring device 24 may comprise a sonar depth measuring instrument employing a pulse echo sonar apparatus or other suitable well-known means to determine the depth of the water beneath the buoy. The transmitter 23 transmits to a remote point, such as the airplane 1, the depth information measured by the device 24. The transmitter 23 may be a continuous wave radio frequency modulated transmitter whose frequency of transmission is controlled by the value of the depth indicated by the device 24. The technique for telemetering information by frequency modulation methods is old and well known, and for this reason the details of the transmitter 23 has been omitted. Needless to say, it is not the intention to limit the invention to any specific telemetering or condition-measuring system. The buoys transmit at different radio frequencies by which they are individually identified, and the airplane 1 has a radio receiver tunable to each frequency and also detunable so as not to detect any such frequency, and a quick and accurate plot of the depth variation along the predetermined path may be drawn on a strip, as will appear. In a case where a large area is being surveyed, the airplane 1 in dropping the buoys would probably follow a series of parallel paths, two of which, $P_1$ and $P_2$, are shown in FIG. 1.

Figure 3:
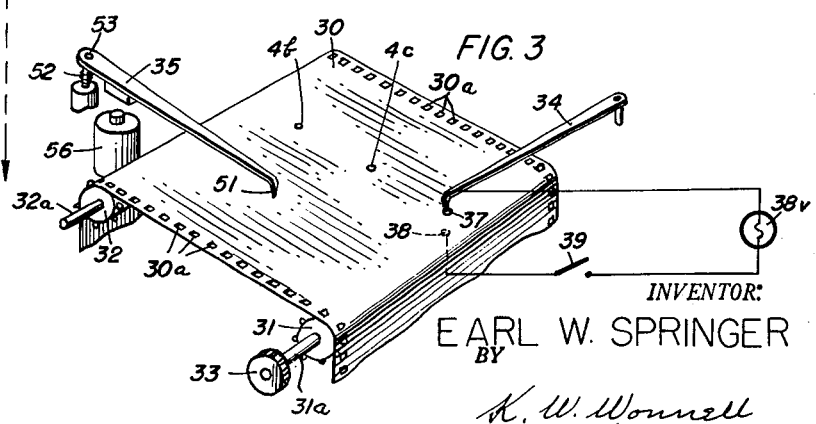
FIG. 3 is a perspective view of a portion of the recording apparatus in the airplane.

Another aspect of the invention includes the use of a recording apparatus by means of which an almost automatic plot of the depths may be obtained. Part of this apparatus is shown in FIG. 3 and comprises a strip 30 of recording material, such as paper, which may be perforated as at 30a for translation by suitable sprockets 31 and 32, keyed to shafts 31a and 32a, respectively, a hand knob 33 being fixed to the shaft 31a. Two recording styli 34 and 35 are provided to make appropriate indications on the strip 30.

The stylus 34 is utilized to make an indication on the strip 30 whenever a buoy is dropped from the airplane 1. The stylus 34 may comprise a contact 37 located adjacent a face of the strip 30 and a second contact 38 located at the opposite face of the strip. A source of voltage 38v and a switch 39 are inserted in series with the contacts 37 and 38. The dropping of a buoy from the airplane 1 closes the switch 39, causing a spark to jump between the contacts 37 and 38 and produce a small hole in the strip 30. Thus the successive holes 4a, 4b, 4c, 4d, 4e, etc. indicate the relative positions at which the respective buoys were dropped along the flight path. A system such as disclosed in FIG. 3 would be suitable, for example, where an automatic buoy-dropping device operated to close the switch 39 as a buoy or each of several buoys is dropped from the airplane 1. The speed of the recording strip 30 is made proportional to the ground speed of the aircraft 1, so that the spacing between the holes 4a, 4b, etc. will be proportional to the relative spacing between the buoys 2a, 2b, etc., identified by the respective holes. To this end, the shaft 32a is coupled to a motor whose speed is determined by the ground speed of the airplane 1. As shown in block form in FIG. 4, such a system could include an appropriate device 42 which could be a well-known air speed indicator having a shaft 43 and corrected to indicate ground speed. A potentiometer 46 may control the field current of a direct current motor 47 to vary the speed thereof in accordance with the potentiometer setting. The position of the shaft of the potentiometer 46 could be made to correspond with that of the speed indicator shaft 43 by means of a servo system in a well-known manner.

The stylus 35 is provided to indicate on the strip 30 the value of the depth or other measured condition, and has a tip 51 adapted to be raised from the strip by suitable means such as a helical spring 52 about a shaft 53, to which the stylus is slidably keyed.

Located adjacent the stylus 35 is a relay 56 which when energized pulls the stylus downward, against the resistance of the spring 52, and holds the tip 51 in contact with the strip 30. The relay 56 is energized when the radio receiver in the airplane 1 tunes in a signal from one of the buoys. The rotary position of the shaft 53 and hence of the stylus 35 is controlled by the value of the depth or other condition being measured as indicated by the signal received from a particular buoy. The tip 51 may comprise, for example, a piece of lead or other suitable material capable of recording an impression on the strip 30. The tip 51 will therefore only make a line (arc) indication on the strip 30 when a signal is being received, the extent of the line from a zero or reference position being a measure of the variable transmitted.

Preferably the frequency bands in which the buoys transmit are adjacent one another and increase or decrease in frequency in the order in which the buoys were dropped. Under these circumstances the apparatus of this invention would be utilized as follows (referring now more particularly to FIGS. 3 and 6):

The strip 30 there shown has a series of successively placed marks or holes 4a, 4b, 4c, 4d, 4e, etc. respectively made by the stylus 34 when the buoys 2a, 2b, 2c, 2d, 2e, etc. (FIG. 1) were respectively dropped from the airplane 1. With the radio receiver in the airplane detuned, so that the tip 51 of the stylus 35 is in a zero or reference position at the margin along which the buoy-identifying holes 4a, 4b, etc. are located, the strip 30 is translated by means of the manual knob 33, which is rotated until the tip is opposite and near the hole 4a representing the position of the buoy 2a. The radio receiver in the airplane 1 is then turned to the frequency band in which the buoy 2a is transmitting. As this is done, the relay 56 becomes energized and holds the tip 51 in contact with strip 30. In the meantime, in response to the signal from the buoy 2a, the shaft 53 has been rotated (by means noted below) to the extent shown by the arc 5a on the strip 30, said extent representing the value of the condition being measured, such as the depth of the water beneath the buoy 2a. The radio receiver is then tuned to a frequency between the bands in which the buoys 2a and 2b transmit, whereupon the relay 56 becomes de-energized and the spring 52 lifts the tip 51 from the strip 30, and the shaft 53 is return-rotated to its initial position, locating the tip at the aforesaid margin. Then the knob 33 is turned to translate the strip 30 until the tip 51 is adjacent the mark 4b which represents the position of the buoy 2b. The frequency band identified with the buoy 2b is discontinuous with, but near, the frequency band identified with the buoy 2a, so that the signal from the buoy 2b may be quickly tuned in by the radio receiver in the airplane 1. When this is done, an arc 5b is made on the strip 30 by the tip 51, and this procedure is repeated so that a series of arcs 5a, 5b, 5c, 5d, 5e, etc. is obtained opposite the corresponding buoy marks 4a, 4b, 4c, 4d, 4e, etc. A line 60 may then be drawn connecting those termini of the lines 5a, 5b, etc. which are remote from the marks 4a, 4b, etc. respectively, to obtain a water depth profile along the path $P_1$ (FIG. 1). The same procedure may be repeated for other paths such as $P_2$ (FIG. 1).

FIG. 7 is a block diagram of the components needed to control the rotary position of the stylus 35 where a continuous wave frequency modulation telemetering system is utilized. As previously stated, the signal transmitted by a particular buoy may vary in frequency within its identifying band with the depth which is being measured thereby. For example, assume a frequency of 500 kilocycles, transmitted by a given buoy, represents the minimum depth, and a frequency of 505 kilocycles represents a maximum depth which can be measured. The radio receiver comprises a radio frequency amplifier 70, a local oscillator 71, and an intermediate frequency amplifier 72 forming a conventional superheterodyne receiver circuit. The local oscillator 71 is tunable so as to enable the signals transmitted in the different frequency bands by the buoys to be recorded opposite the holes or marks indicative of the buoy positions. A frequency discriminator 73 is provided to convert the frequency deviation from the carrier frequency to a direct current voltage of a value proportional to the frequency deviation. The RF and IF amplifiers are assumed to have a band width of at least 5 kilocycles, so that any frequency within the range of 500–505 kilocycles would be indicated. The RF amplifier 70 and local oscillator 71 would be tuned, however, to a dial reading of 500 kilocycles. Assuming an IF frequency of 200 kilocycles, the local oscillator would then be oscillating at a frequency of 700 kilocycles, and the frequency at the output of the IF amplifier 72 would therefore vary between 200 and 205 kilocycles depending upon the particular depth being indicated. The discriminator 73 may comprise any conventional frequency modulation discriminator circuit having a direct current rather than an alternating current coupling circuit in its output, so that the output voltage thereof is proportional to the input frequency. A suitable D.C. voltmeter 74 coupled to the discriminator output would therefore indicate the frequency input to the discriminator 73 and hence would be a measure of the depth measured by the buoy whose signal is being received. The shaft position of the D.C. voltmeter 74 may be made to correspond with the position of the shaft 53 of the stylus 35 by means of a conventional servo transfer link. If the frequency range of the adjacent buoy is 510–515 kilocycles, then, to receive signals from that buoy, the radio receiver would be set at a dial reading of 510 kilocycles.

Where the information being telemetered by a particular buoy varies with the distance below the surface of the water, such as the temperature or pressure, then somewhat different apparatus is employed. For example, as shown in FIG. 8, if it is desired to measure temperature or pressure variations with distance beneath the buoy, it is necessary that the measuring device, such as that shown at 75, be lowered gradually from the main body portion of the floatable buoy 76. As the measuring device 75 is lowered, the transmitting device in the buoy 76 will, of course, transmit a different signal indicating the new condition measured. In this embodiment, it may be necessary that the time at which the lowered device 75 is released from the buoy be controlled by a person on the airplane, so that the receiver on the airplane may receive only one signal at a time. In this case, the pilot of the airplane would press a contact button which would transmit to the buoy 76 a signal which would cause the measuring device 75 to be released. The device 75 may be a free-sinking device which communicates with the transmitting device in the buoy 76 by means of any suitable apparatus which may be a sonar, a radio, or a direct electrical connection through the salt water medium. Because the signal transmitted by the buoy 76 would probably vary as the condition measuring device 75 is lowered, the recording system previously described must be somewhat modified in order to be able to record these variations.

Referring now to FIG. 9, the recording strip 30 may be divided into separate sections, such as $S_1$, $S_2$, $S_3$, etc., on which the information received from the respective buoys would be recorded. The transverse variations of the curve 77a recorded by the stylus 35 would indicate the variations of the condition measured. The strip 30, however, would have to be continuously moved during a period of reception from a particular buoy in order that the curve recorded on the strip may include a variable as to the depth of the measuring device 75 at a particular moment.

In determining the position of the measuring device 75 as a function of time, it is a simple matter to control the speed of the strip 30 when receiving a signal, so that, by reference to a longitudinal base line 80 having a predetermined scale factor, the depth of the measuring device may be quickly associated with a particular position along the curve 77a.

It is thus apparent that this invention provides a novel and effective system for quickly and accurately surveying the depth or other measurable condition, characteristic, or quality over a large area of a given body of water.

Obviously many modifications and variations of the invention are possible in the light of the above teachings. It is therefore to be understood that within the scope of the appended claims the invention may be practiced otherwise than as specifically described.

I claim:

1. A method of determining oceanographic conditions of a body of water, comprising the steps of dropping at intervals along a predetermined path from a vehicle moving over the body of water a series of buoys each capable of measuring and telemetering with a distinctive signal a characteristic of the body of water adjacent the telemetering buoy, recording on a recording strip at a remote point index marks representing the respective buoys and spaced in proportion to the spacing of the several buoys, measuring and telemetering the measure of the characteristic related to each buoy, successively detecting the telemetered signals, and recording on the strip the value of each detected signal opposite the index mark representing the buoy telemetering that signal.

2. An oceanographic condition survey system, comprising a plurality of water-depth-measuring buoys having means for telemetering the depth with signals identifying the buoys from which they emanate, a vehicle carrying the buoys and movable over a body of water and having means for dropping the buoys at intervals along a predetermined path in the body of water, receiving apparatus on the vehicle for selectively detecting the signals from the buoys, a recording device on the vehicle, said device including a movable recording strip, means connected to the vehicle for moving the strip at a speed proportional to the ground speed of the vehicle, a first recording means actuated by the dropping of each buoy for recording on the moving strip index marks identifying the respective several buoys, a second recording means coupled to the receiving apparatus and responsive to the detected signals for recording the detected signal values on the strip, and means for repositioning the strip to enable the recorded values to be located adjacent the respective index marks, whereby each recorded value will be identified with the buoy telemetering the signal resulting in that recorded value.

3. A method of determining the depth variation of a body of water along a predetermined path, comprising the steps of dropping at intervals along the path from a vehicle moving over the body of water a series of telemetering water-depth-measuring buoys, recording on a strip a series of index marks respectively identifying the several buoys and proportionately spaced, measuring the water depth at each buoy, telemetering the value of the measured depth, successively detecting the signals telemetered by the respective buoys, and recording on the strip the value of each signal opposite the corresponding index mark.

4. A method of obtaining a survey of an oceanographic characteristic of a body of water under a predetermined horizontal path, comprising the steps of locating in the water, at intervals below said path, a series of telemetering sonobuoys, each capable of telemetering a signal which distinguishes that sonobuoy from the others and is a measure of the value of said oceanographic characteristic of the water below that sonobuoy, recording at a point remote from the sonobuoys the identities and positions of the respective sonobuoys, and detecting and recording the several signals at said point.

5. A method of obtaining a survey of an oceanographic characteristic of a body of water, comprising the steps of jettisoning, at intervals from a vehicle moving in a predetermined path over the water, a series of buoys capable of measuring the values of said characteristic at the sites of the respective buoys and telemetering the values with signals identifying the respective buoys, recording on the vehicle the identities and the sites of the respective buoys, and detecting and recording on the vehicle the signals from the respective buoys.

6. A method of obtaining a survey of an oceanographic characteristic of a body of water under a predetermined horizontal path, comprising the steps of jettisoning, at intervals from an aircraft moving in one pass along said path, a series of telemetering sonobuoys, each capable of telemetering a signal which distinguishes that sonobuoy from the others and is a measure of the value of said characteristic of the water below that sonobuoy, driving during said pass a recording strip on the aircraft at a speed proportional to the ground speed of the aircraft, recording on the moving strip during said pass a series of marks at intervals proportional to the intervals separating and identifying the respective sonobuoys in order, and detecting and recording on the strip, adjacent the respective marks, the values represented by the respective signals.

7. A method of obtaining a rapid survey of an oceanographic characteristic of a body of water, comprising the steps of jettisoning, at intervals from an airplane flying in a predetermined path over the water, a series of buoys capable of measuring the values of said characteristic at the sites of the respective buoys and telemetering the values with signals identifying the respective buoys, recording on the airplane while still in flight the identities and sites of the respective buoys, and detecting and recording on the airplane while still in flight the signals from the respective buoys.

8. In a system for obtaining a survey of an oceanographic characteristic of a body of water, a plurality of buoys in the body of water at intervals in a predetermined row, each buoy having means for measuring said characteristic of the water thereat and for transmitting a radio signal which represents that measure, the carrier frequencies of the signals progressing in the order of the buoys in the row, a recording apparatus remote from the buoys and including a strip bearing marks in a row representing the several buoys and their locations, a radio receiver tunable to the several signals, a stylus having a marking tip adjacent the strip, means for adjusting the strip to selectively locate the tip adjacent each mark, and means actuated by the tuned signal from the buoy represented by that mark for causing the tip to produce on the strip adjacent that mark a line whose length corresponds to the measure represented by that signal, whereby a graph drawn through the termini of the lines corresponding to the several buoys will chart the values of said characteristic along said row.

9. Means for obtaining a rapid survey of an oceanographic characteristic of a body of water at a series of horizontally spaced locations, comprising an airplane moving horizontally in a predetermined direction over a body of water, a plurality of buoys carried by the airplane, means for jettisoning the buoys one by one at intervals into the water, recording apparatus carried by the airplane and including a strip, means for moving the strip at a speed proportional to the ground speed of the airplane, means actuated by the jettisoning means for marking the strip whenever a buoy is jettisoned so as to provide a series of marks identifying the several buoys and spaced in proportion to the spacing of the jettisoned buoys, a stylus having a tip, means operative at the completion of the buoy-jettisoning run of the airplane for locating the tip adjacent the mark representing any selected jettisoned buoy, each buoy having means operative, when the buoy is in the water, to measure said characteristic of the water beneath that buoy and transmit a radio signal which represents that measure and is identified with that buoy only, a radio receiver carried by the airplane and capable of selectively tuning in the signals from the respective buoys, and means actuated by the tuned signal from each buoy for causing the tip to draw on the strip a line corresponding in length with that measure, so that a curve drawn through the termini of the lines will chart the information desired.

10. Apparatus for obtaining a survey of an oceanographic characteristic of a body of water, comprising a plurality of buoys arranged in the water at intervals in a predetermined path, each buoy having means for detecting the value of said characteristic of the water thereat, each buoy also having means for telemetering the detected value of said characteristic at that buoy with a signal which distinguishes that buoy from the others, means at a location remote from the buoys for recording the identities and positions of the several buoys, and means at said location for detecting and recording the transmitted signals from the several buoys.

11. A system for obtaining a survey of an oceanographic characteristic of a body of water, comprising a vehicle capable of moving over a body of water and carrying a plurality of buoys, means for jettisoning the buoys one by one along a predetermined path, each buoy having means operative, when the buoy is in the water, to detect the value of said characteristic of the water at the site of the buoy, each buoy having means for telemetering the detected value at that buoy with a signal which is peculiar to that buoy, receiving apparatus on the vehicle for selectively detecting the telemetered signals, a movable strip on the vehicle, means for moving the strip at a speed proportional to the ground speed of the vehicle, a first recording means actuated by the jettisoning of each buoy for placing on the moving strip a mark representing that buoy, whereby the spacing of the marks will correspond to the spacing of the jettisoned buoys, means for rendering the strip-moving means inoperative at the jettisoning of the last buoy, and a second recording means coupled to the receiving apparatus and operative while the strip is stationary for indicating on the strip at each index mark the value of the signal received from the corresponding buoy.

12. Apparatus for surveying the depth of a body of water, comprising a plurality of buoys spaced in known positions along a predetermined path in the water, each buoy having means for detecting a measure of the depth of the water at that buoy, each buoy having means for telemetering, with a signal peculiar to that buoy, the detected measure, and apparatus including a receiver remote from the buoys for selectively detecting and recording the several signals.

References Cited in the file of this patent

UNITED STATES PATENTS

| | | |
|---|---|---|
| 967,623 | Evenson | Aug. 16, 1910 |
| 2,355,502 | Barton | Aug. 8, 1944 |
| 2,361,177 | Chilowsky | Oct. 24, 1944 |
| 2,414,091 | Chappell | Jan. 14, 1947 |
| 2,447,069 | Holcomb | Aug. 17, 1948 |
| 2,448,787 | Ferrel | Sept. 7, 1948 |
| 2,567,229 | Morse | Sept. 11, 1951 |
| 2,749,436 | Rines | June 5, 1956 |
| 2,756,404 | Anderson | July 24, 1956 |
| 2,758,203 | Harris | Aug. 7, 1956 |
| 2,821,853 | Ruskin | Feb. 4, 1958 |
| 2,869,108 | Smith | Jan. 13, 1959 |